United States Patent [19]

Egerdahl

[11] Patent Number: 4,588,113
[45] Date of Patent: May 13, 1986

[54] COMBINED DROP AND BROADCAST SPREADER FOR GRANULAR MATERIAL

[76] Inventor: Raymond H. Egerdahl, 1208 S. 75th St., West Allis, Wis. 53214

[21] Appl. No.: 578,376

[22] Filed: Feb. 8, 1984

[51] Int. Cl.⁴ .............................................. E01C 19/20
[52] U.S. Cl. .................... 222/626; 222/238; 222/279; 239/663
[58] Field of Search ............... 222/626, 181, 279, 278, 222/608, 236, 238, 410, 627; 291/32; 239/663, 681, 687

[56] References Cited

U.S. PATENT DOCUMENTS

| | | | |
|---|---|---|---|
| 1,888,821 | 11/1932 | Fearn | 222/625 |
| 2,474,065 | 6/1949 | Porter | 239/663 |
| 2,668,060 | 2/1954 | Tygart | 239/663 |
| 2,872,080 | 2/1959 | Thene | 222/238 X |
| 3,276,633 | 10/1966 | Rahauser | 222/239 X |
| 3,510,066 | 5/1970 | Swenson | 239/687 X |
| 3,620,458 | 11/1971 | Rath | 239/663 X |
| 4,415,104 | 11/1983 | Boudreault | 222/626 X |

Primary Examiner—Joseph J. Rolla
Assistant Examiner—Nils E. Pedersen
Attorney, Agent, or Firm—Andrus, Sceales, Starke & Sawall

[57] ABSTRACT

A combined drop and broadcast spreader for granular material is mountable on the implement of a front end loader. The spreader includes a hopper containing a plurality of discharge openings in the bottom. A rotatable impeller in the bottom forces the granular material from the openings during drop spreadings. A rotatable spreader means is coupled to the rear wall of the hopper for discharging granular material in an arc-like pattern. The rear of the hopper includes a door for selectively supplying granular material from the hopper to the spreader means for broadcast spreading.

16 Claims, 5 Drawing Figures

COMBINED DROP AND BROADCAST SPREADER FOR GRANULAR MATERIAL

The present invention relates to an improved, vehicle mounted spreader for granular material such as salt, sand, fertilizer, and the like.

In many applications, spreaders are subjected to two, somewhat opposing, demands. In some applications, a very precise spreading of the granular material is required. For example, in salting sidewalks, accurate spreading is required to avoid damage to bordering vegetation. Other applications require large area spreading with only little concern for accuracy. Salting a parking lot is a typical example of such an application.

The present invention is directed to a spreader that can fulfill both such requirements. To this end, the spreader of the present invention can drop the granular material straight down, thereby to accurately cover the area to be spread and avoid spillover to areas not intended to be covered. Or, the spreader may broadcast the granular material and thus cover a large area as the vehicle proceeds. The change between operation in the drop mode and operation in the the broadcast mode, as well as the stopping and starting of the spreading action, can be easily and quickly accomplished. The spreader is capable of handling dry or damp granular material and material containing agglomerated granules. The spreader provides close control of the amount of granular material being spread in both modes of operation.

The spreader of the present invention is suitable for easy attachment to the implement mount of a front end loader vehicle. By mounting the spreader on the front of the vehicle, the spreading action can be more easily viewed by the operator than with more conventional rear mounted or towed spreaders. Mounting the spreader on a front end loader also permits the spreader to be easily loaded, emptied, and cleaned by manipulating the implement. It also permits the height of the spreader to be changed. For example, the spreader may be lowered to improve operator visibility when spot spreading and to lessen blowing of the granular material. The spreader can be raised to, for example, salt stairs. Mounting the spreader on the front of the vehicle enables granular material to be spread in areas that could not be reached by a towed spreader and permits use in special applications, such as salting under parked cars.

Briefly, the combined drop and broadcast spreader of the present invention is suitable for mounting on the implement of a front end loader. The spreader includes a hopper for receiving the granular material. The hopper, which may be of a generally V-shaped trough-like shape, contains a plurality of openings in the bottom through which the granular material is discharged in the drop mode. A rotatable impeller is positioned in the bottom of the hopper above the discharge openings. The impeller has a plurality of circumferentially spaced blades for forcing granular material from the openings. The rear wall of the hopper has an opening for supplying granular material from the hopper to a spreader means positioned below the hopper. The opening is selectively closeable by a door. Granular material may be supplied from the hopper through the opening to the spreader means for broadcast spreading. The hopper may contain an agitator to maintain the granular material in a fluent condition. The agitator, impeller, and spreader means may be operated by hydraulic motors. The door in the rear wall of the hopper may be opened and closed by a hydraulic cylinder.

The invention will be further understood by reference to the drawing in which.

In the figures, the combined drop and broadcast spreader of the present invention is indicated by the numeral 10. Spreader 10 is designed for mounting on the forward portion of a vehicle, such as a conventional front end loader. As such, spreader 10 has suitable attachment means comprising pairs of spaced flanges 12, shown in FIG. 1, to affix the spreader to the movable implement on the front end loader. The implement, and attached spreader 10 is vertically movable in height and rotatable about a horizontal axis.

Figure 1:
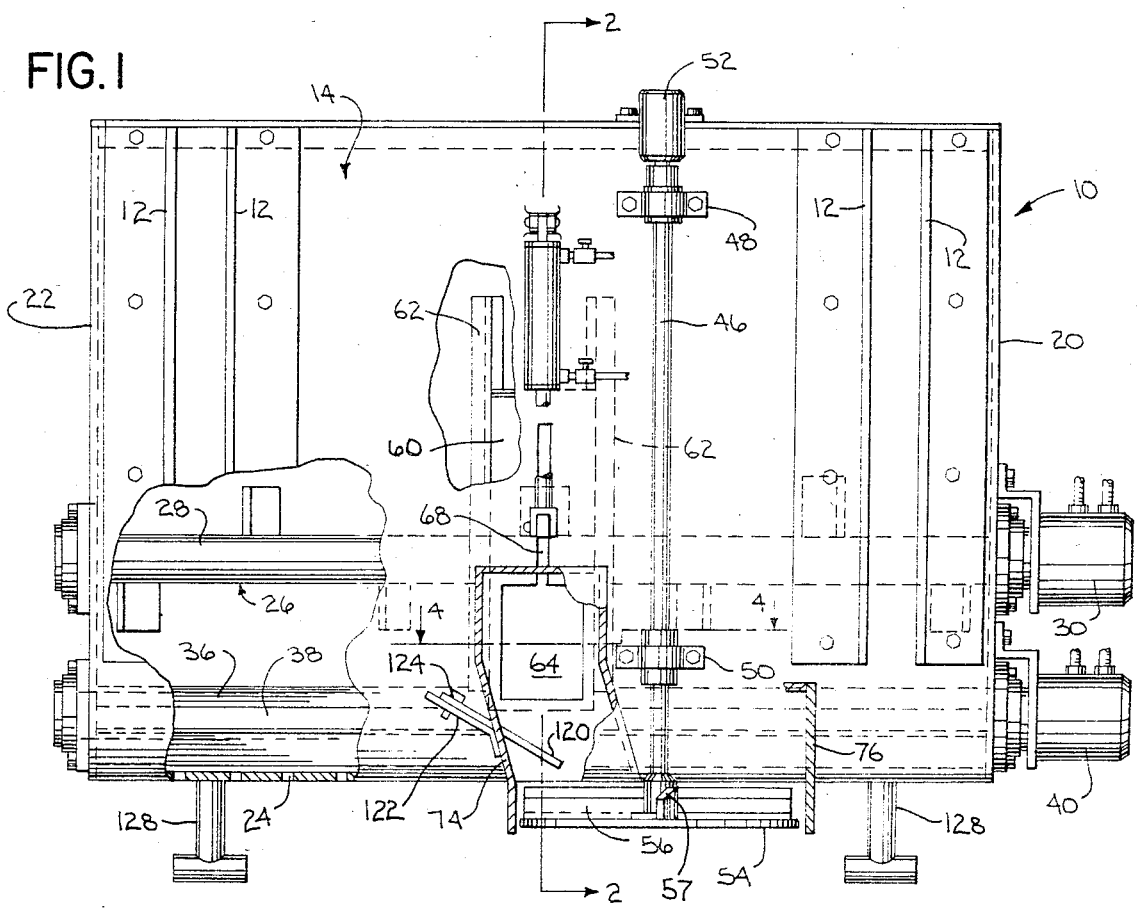
FIG. 1 is a partially broken-away rear view of the improved spreader of the present invention.

Spreader 10 includes hopper 14 for containing granular material, such as salt, sand, or fertilizer, to be spread. Hopper 14 may have the generally V-shaped trough-like configuration shown in FIG. 2 formed by slanting front wall 16 and generally perpendicular rear wall 18. The attachment means 12 for spreader 10 is fastened to rear wall 18. The ends of hopper 14 are closed by walls 20, 22. The bottom of hopper 14 is curved in a generally U-shape to follow the arc of the blades of an impeller, hereinafter described. A plurality of drop spreading holes 24 are spaced in a line along the bottom of hopper 14, as shown in FIG. 1.

A material agitator 26 is mounted in the lower portion of hopper 14. Agitator 26 comprises a central shaft 28 journalled in end walls 20, 22 and driven by motor 30 to rotate in the counterclockwise direction when viewed as in FIG. 2. A plurality of agitator blades 32 extend from shaft 28. As shown in FIG. 3, the blades slant with respect to a plane normal to the axis of shaft 28 so that the blades urge the material toward the center of hopper 14 when the shaft is rotated. A centrally located V-like blade 34 is mounted in the central portion of shaft 28.

Impeller 36 is mounted in the bottom of hopper 14 below agitator 26. Impeller 36 includes a central shaft 38 journalled in end walls 20, 22 and driven by hydraulic motor 40 to rotate in the counterclockwise direction when viewed as in FIG. 2. A plurality of impeller blades 42 extend along the length of shaft 38 at peripherally spaced locations. Impeller blades 42 are generally triangular in cross-sectional configuration having sides 44 positioned somewhat radially to shaft 38 and sides 46 positioned somewhat tangentially to shaft 38.

A spreader means for broadcast spreading is connected to rear wall 18 of hopper 14. Vertical shaft 46 is journalled on rear wall 18 by journals 48 and 50. The upper end of shaft 46 is coupled to motor 52 to rotate the shaft counterclockwise when viewed as in FIG. 4. Spreader disc 54 is mounted on the lower end of shaft 46. Spreader disc 54 includes arcuately spaced radial flanges 56 having portion 57 bent in the direction of rotation.

Rear wall 18 of hopper 14 has door 60 that slides in spaced tracks 62 to uncover opening 64 when in an upper position. Door 60 has tang 66 extending through slot 68 in wall 18 for coupling to piston rod 70 of hydraulic cylinder 72 fastened to wall 18.

Figure 4:
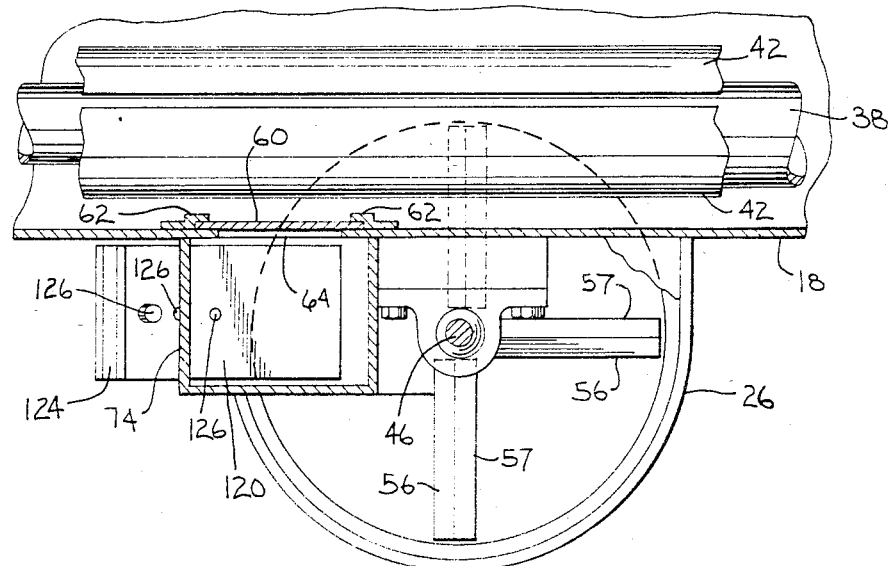
FIG. 4 is a horizontal cross-sectional partial view of the spreader taken along the line 4—4 of FIG. 1.

Housing 74 mounted on rear wall 18 directs granular material exiting hopper 14 through opening 64 onto spreader disc 54 at a generally tangential location as shown in FIGS. 1, and 4. Blade 120 extends into housing 74 to control the amount of granular material passing through the housing. Blade 120 is mounted on bracket 122 by pin 124. Pin 124 may be placed in one of holes 126 in bracket 124 to control the position of blade 120.

Curved shroud 76 is fastened to housing 74 around the rear of spreader disc 54 to direct the granular material in the forward movement direction of spreader 10 in a generally arc-like discharge configuration.

Supports 128 permit spreader 10 to rest on the ground without damage.

Figure 5:
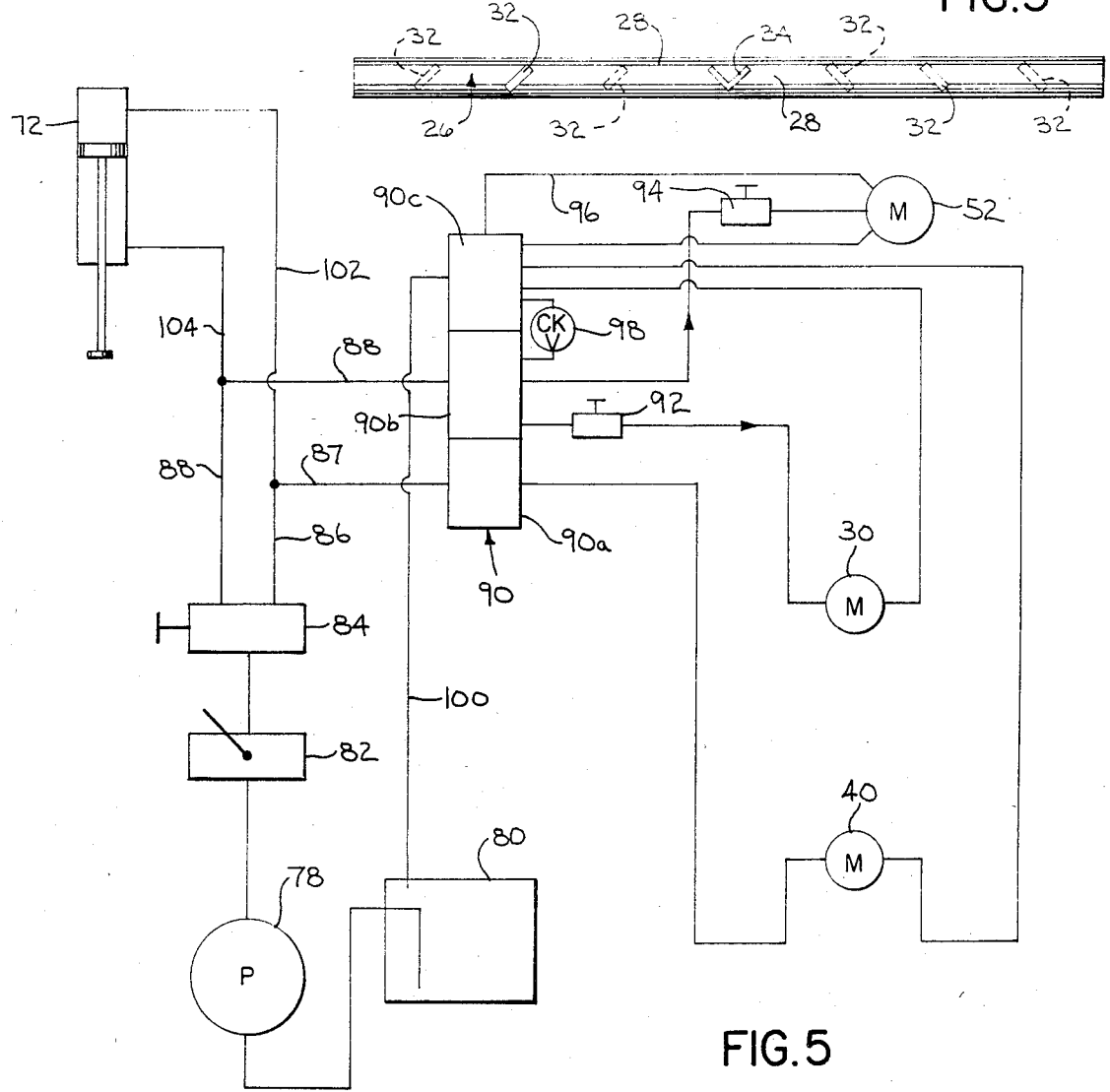
FIG. 5 is a schematic diagram of a hydraulic circuit suitable for use in the spreader of the present invention.

FIG. 5 shows a hydraulic circuit for operating spreader 10. It will be appreciated that portions of the hydraulic circuit may be incorporated in the hydraulic circuit of the front end loader to which spreader 10 is attached. The hydraulic circuit includes pump 78 that withdraws hydraulic fluid from sump 80. Throttle valve 82 controls the rate of flow of hydraulic fluid through the remaining portions of the hydraulic circuit. Selector valve 84 determines whether the hydraulic fluid flows through line 86 or 88. Lines 86 and 88 are connected to three compartment manifold 90. Specifically, hydraulic line 86 is connected to the input of compartment 90a by line 87. The output of compartment 90a is connected to motor 40 that operates impeller 36. Hydraulic line 88 is connected to the input of compartment 90b. The output of compartment 90b is connected to agitator motor 30 and motor 52 connected to the broadcast spreader means. Needle valves 92 and 94 are interposed between compartment 90b and motor 30 and between compartment 90b and motor 52. Compartment 90c receives the return line flow from motors 30, 40, and 52 and bleed line 96 from motor 52. Check valve 98 is connected between compartments 90b and 90c. Hydraulic line 100 returns hydraulic fluid to sump 80. Hydraulic lines 86 and 88 are connected to hydraulic cylinder 72 through hydraulic lines 102 and 104.

Figure 2:
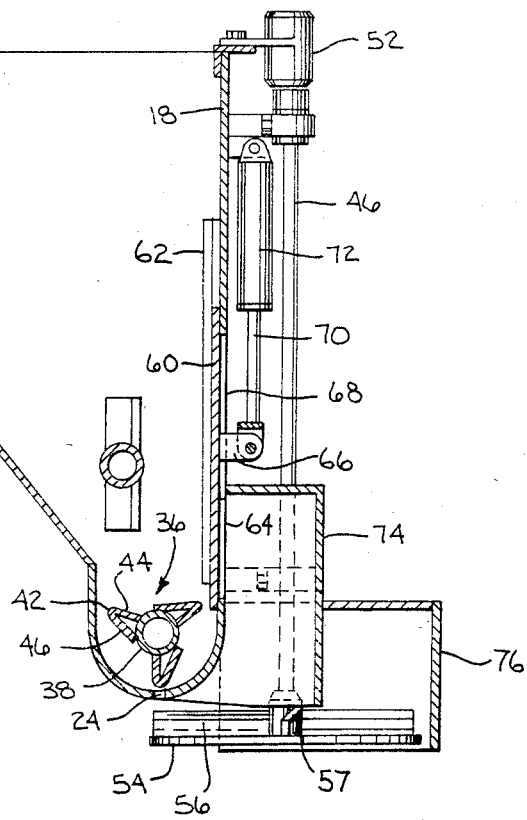
FIG. 2 is a vertical cross-sectional view of the spreader taken along the line 2—2 of FIG. 1.
Figure 3:
FIG. 3 is a plan view of the agitator assembly of the present invention.

In operation, spreader 10, mounted on the front end loader, is rotated in the counterclockwise direction when viewed as in FIG. 2 so that hopper 14 is tipped forward. The spreader is advanced into a pile of granular material, such as salt, to fill hopper 14. Spreader 10 is then rotated clockwise to return it to the operating position. If drop spreading is desired on the area to be spread, selector valve 84 is operated to provide hydraulic fluid in lines 86 and 102 to close opening 64 with door 60. Hydraulic fluid is also provided in hydraulic lines 86 and 87 to manifold compartment 90a to cause motor 40 to rotate impeller 36 at a speed determined by throttle valve 82. The rotation of impeller 36 causes the granular material to drop from holes 24 in the bottom of hopper 14. The slanting surfaces 46 of impeller blades 42 when coupled with the counterclockwise rotation of impeller 36 provides a compressing action of the salt against the bottom of hopper 14 that is highly effective in forcing the granular material out of holes 24. This compressing action permits spreader 10 to be used with either dry or damp material. The vehicle and spreader 10 proceed along the area to be spread to deposit the granular material. The speed of impeller 36 and the speed of the front end loader determines the amount of material applied per unit area.

If it is desired to broadcast spread the granular material, selector valve 84 is operated to supply hydraulic fluid to hydraulic line 88. This supplies hydraulic fluid to line 104 and causes piston rod 70 of cylinder 72 to retract, moving door 60 to the open position. Hydraulic fluid in hydraulic line 88 is supplied to manifold compartment 90b to rotate agitator motor 30 and spreader disc motor 52. The action of agitator 26 causes salt to flow out opening 64 through housing 74 onto spreader disc 54. The rotation of spreader disc 54 throws the granular material forward in an arc-like pattern to cover a large area as spreader 10 is moved forward. Motor 40 for impeller 36 is not energized during broadcast spreading. The static condition of impeller 36 minimizes or eliminates any discharge of salt from holes 24 in the bottom of hopper 14. The speed of disc 54 determine the width of the spreading path. Blade 120 and the speed of the front end loader determine the amount of material applied per unit area.

At the conclusion of the spreading operation, unused granular material can be emptied from hopper 14 by rotating spreader 10 on the front end loader about the horizontal axis of the implement to spill the granular material from the hopper and return it to the storage pile.

Spreader 10 may be easily cleaned by rotating the spreader about a horizontal axis until hopper 12 is upside down. Spreader 10 may then be flushed with water or other cleaning liquid. The movable elements of the spreader may be operated as the flushing proceeds to insure thorough cleaning.

Various modes of carrying out the invention are contemplated as being within the scope of the following claims particularly pointing out and distinctly claiming the subject matter which is regarded as the invention.

I claim:

1. A combined drop and broadcast spreader for granular material mountable on a vehicle and comprising:
    a hopper for receiving the granular material, said hopper having a bottom containing a row of material discharge holes oriented normal to the direction of travel of the vehicle, said hopper having a side wall lying parallel to the row of holes, said side wall having an opening for passing granular material in the central portion thereof;
    a rotatable impeller adjacent the bottom of said hopper above said plurality of discharge holes for forcing granular material to drop from said plurality of holes;
    a rotatable broadcast means coupled to said hopper for broadcasting granular material supplied thereto, said rotatable broadcast means being mounted on said side wall in the central portion thereof proximate to said opening; and
    housing means on said side wall for directing granular material passing from said opening to said rotatable broadcast means.

2. A spreader according to claim 1 including means for selectively closing said opening in said side wall.

3. A spreader according to claim 1 wherein said hopper has a generally V-shaped trough-like configuration.

4. A spreader according to claim 1 said impeller includes a shaft lying along said row of holes and a plurality of blades on said shaft for forcing the granular material to drop from said holes.

5. A spreader according to claim 4 wherein the bottom of the hopper has a configuration conforming to the sweep of the impeller blades, and wherein said blades have a surface lying tangentially with respect to said shaft for forcing granular material to drop from said holes.

6. A spreader according to claim 1 including hydraulic means for rotating one or the other of said impeller and broadcast means.

7. A spreader according to claim 6 including hydraulic means for obtaining a supply of granular material to said broadcast means when said broadcast means is rotating.

8. A spreader according to claim 1 further defined as suitable for mounting on the forward portions of a vehicle.

9. A spreader according to claim 8 further defined as suitable for mounting on a front end loader vehicle.

10. A spreader according to claim 1, wherein said broadcast means comprises a generally horizontal rotating disc upon which the granular material is supplied.

11. A spreader according to claim 10 including a shroud about a portion of the perimeter of the disc for directing the granular material into an arc-like pattern.

12. A spreader according to claim 10 wherein said broadcast means disc has a plurality of generally radial flanges in the surface on which the granular material is supplied.

13. A spreader according to claim 1 further including an agitation means in said hopper above said impeller for rendering the granular material in the hopper fluent.

14. A spreader according to claim 13 including hydraulic means for rotating said agitator means.

15. A spreader according to claim 13 wherein said agitator means has a rotatable shaft extending through said hopper, said shaft having a plurality of agitator blades extending from said shaft at spaced intervals therealong.

16. A spreader according to claim 15 wherein said agitator blades lie at an angle to a plane normal to the axis of the shaft for urging the granular material toward the center of the hopper.

* * * * *